W. E. PAINE.
TRACTION VEHICLE.
APPLICATION FILED APR. 11, 1912.
1,037,168.
Patented Aug. 27, 1912.
2 SHEETS—SHEET 2.
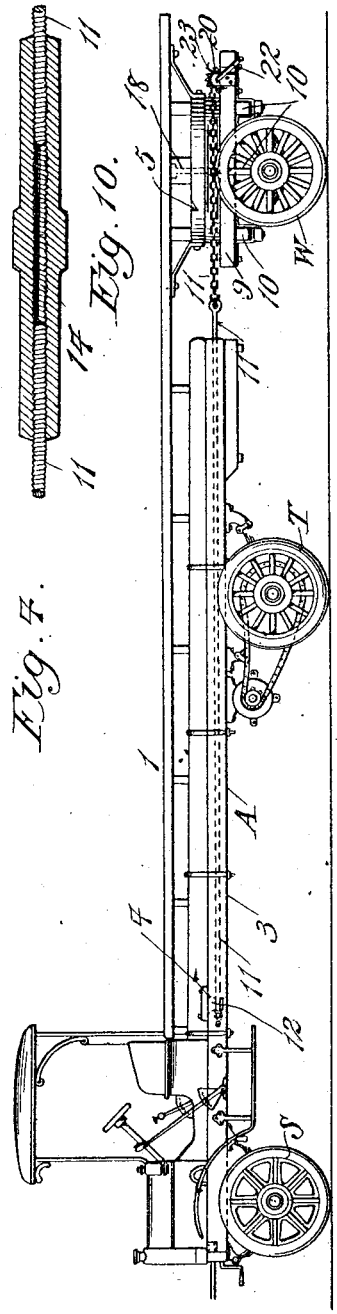
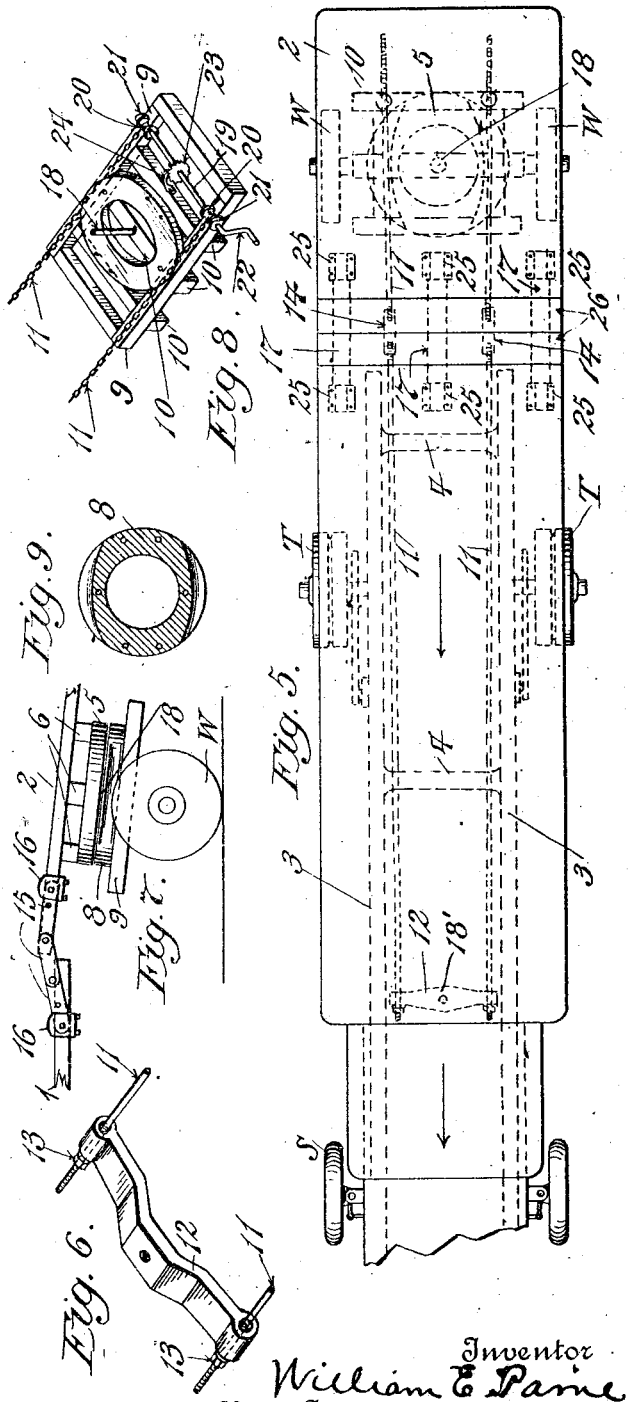
Witnesses:
Edward Rowland
M. F. Keating
Inventor
William E. Paine
By Attorney
Charles V. Kintury

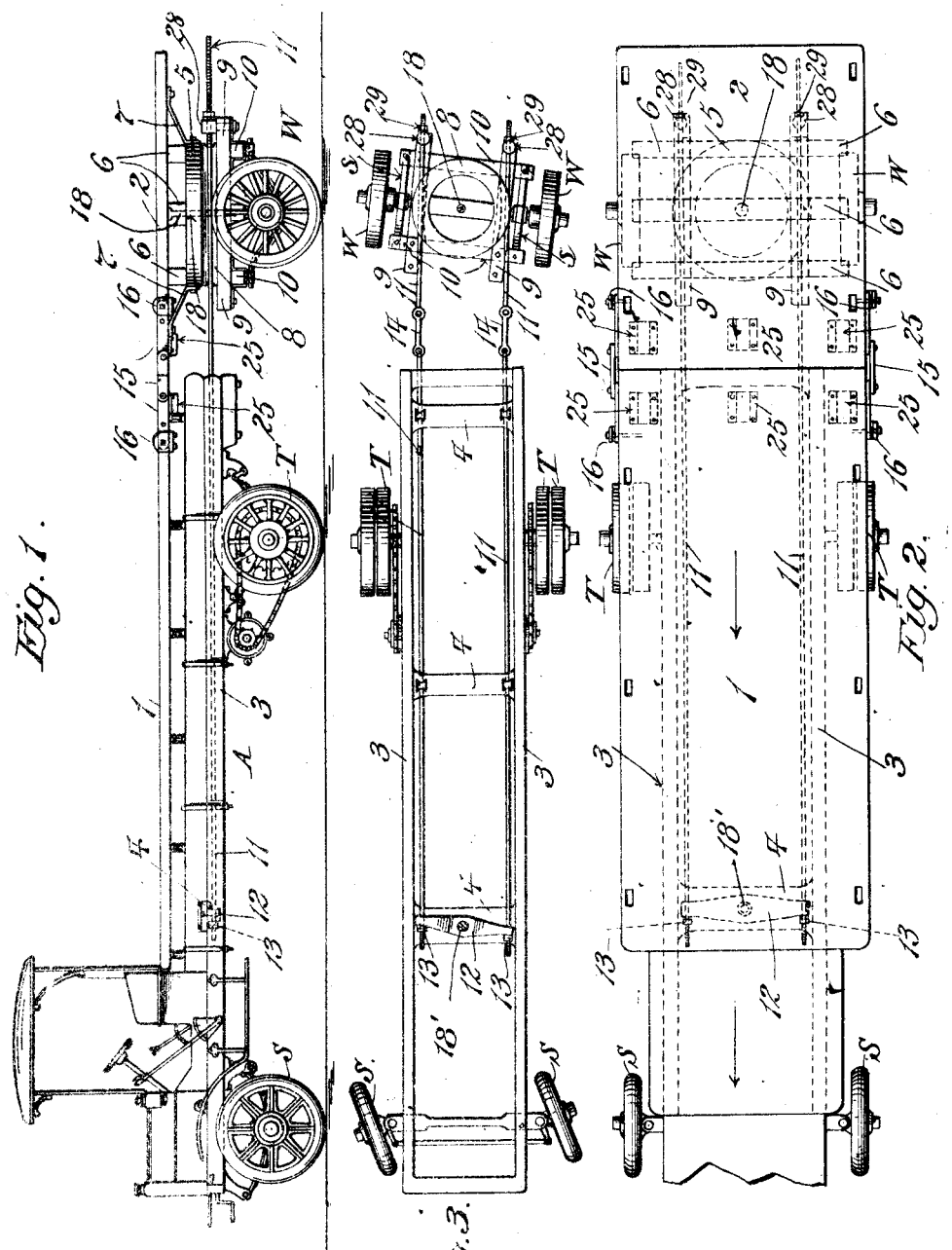

UNITED STATES PATENT OFFICE.

WILLIAM E. PAINE, OF NEW YORK, N. Y.

TRACTION-VEHICLE.

1,037,468.

Specification of Letters Patent.

Patented Aug. 27, 1912.

Application filed April 11, 1912. Serial No. 690,170.

*To all whom it may concern:*

Be it known that I, WILLIAM E. PAINE, a citizen of the United States, and resident of New York, borough of Manhattan, county and State of New York, have made a new and useful Invention in Traction-Vehicles, of which the following is a specification.

My invention is directed particularly to a novel apparatus for carrying heavy loads through the agency of traction vehicles, and it has for its objects, first, to combine a self-propelled traction vehicle having two or more wheels with a trailer in such manner as to carry all loads thereby with the application of a minimum amount of energy. Second, to effect the carriage of a load with such vehicle in such manner that the major portion of the same shall be carried by a trailer, with only so much thereof located with its weight upon the traction wheels as will give the desired traction to carry it over the route where the load is to be transported and with a minimum amount of energy. Third, to combine with a traction vehicle having a plurality of wheels a trailer which is provided with a turn table and which will permit the wheels thereof to move with perfect freedom in an opposite angular direction to the steering wheel or wheels and without any mechanical connection other than the bed or platform between it and the main vehicle so as to transmit the load carried by said bed or platform without in any way shifting the same. Fourth, to provide a vehicle of the character named with a carrying bed or platform of two parts, one of which parts is sustained by the traction wheels and the steering wheel or wheels, and the other part by the wheels of a trailer, and to so connect them together as to be capable of pivotal vertical movement and incapable of lateral movement, so that said bed or platform will carry the load as a mass incapable of shifting its position. Fifth, to so construct a vehicle of the character named that loads of any length within limits may be carried thereon and that the bed or platform may be lengthened or shortened in accordance with the requirements of the load. Sixth, to provide a vehicle of the character named with a trailer having a turn-table connected to an equalizing device which aids in effecting the direction of motion of the trailer wheels in exact accordance with the direction of motion of the steering wheel or wheels and which is also adapted to overcome the disturbing influences due to unequal road-surfaces. Seventh, to so construct a vehicle of the character named that the wheels of the trailer may be caused to track directly with the steering wheels or not and proportionately therewith, in accordance as the distance between the trailer and the traction wheels is increased; and at the same time to maintain the carrying bed or platform always in rigid lateral relation to the several wheels, so that the load cannot shift. Eighth, to provide a vehicle of the character named with a trailer having a turn table, and to connect said turn table by movable chains, cords, or rods and an equalizing device, and with means for adjusting the length of the chains, cords or rods in accordance with the length of the load to be carried. Ninth, to adapt such a vehicle to turn in the shortest possible space and prevent dangerous accidents due to long loads carried thereby.

In a prior patent granted to me on the 7th day of May, 1912, and bearing No. 1,025,714, I have disclosed a method of and apparatus for carrying heavy loads upon a plurality of wheels in which two of said wheels act as steering wheels, two as traction wheels and a third pair as the wheels of a trailer having a turn table, the movable part of which carries or supports a rotatable carrying bed or platform, the front end of which is located in front of the axle of the traction wheels and is adapted to move laterally in either direction in accordance with the position of the traction wheels as governed by the steering wheels. In said patent the load on the front end of the vehicle is described as shifting in proportion as the steering wheel or wheels moves or move either to the right or to the left and the traction wheels are accordingly given a direction of movement equal to or approximate to the direction of movement of the steering wheels.

The present application differs from the invention disclosed in the aforesaid patent essentially in that I maintain the bed or platform practically immovable throughout its length laterally and, therefore, do not shift the load at all but shift the wheels of the trailer so that the traction wheels are practically a pivot point about which they and the steering wheels rotate as the course is varied, in proportion as the distance between the steering wheels and traction wheels and steering wheels and trailer wheels approach an equal distance; so that if this distance be equal and if the vehicle be turned absolutely at right angles with the steering wheels under the bed or platform the trailer wheels will travel absolutely in its tracks and the traction wheels will turn about themselves at a point in the center of their axle as their pivot point, the load maintaining always a constant or fixed relation; that is, not shifting.

In order that my invention may be fully understood reference is had to the accompanying drawings, in which, Figure 1 is a side elevational view of one form thereof, embodying two carrying beds or platforms connected together at the rear end of the truck with a turn table for the trailer connected to equalizing cords, chains, or rods extending to a point near the front end of the main truck; said equalizing rods and their connections being shown in connection with such truck in dotted lines on the front end and in full lines on the rear end. Fig. 2 is a plan view of Fig. 1. Fig. 3 is a horizontal sectional view of Fig. 1 taken beneath the bed or platform and showing also the manner of connecting the trailer to the equalizer. Fig. 4 is a view similar to Fig. 1 of a modified form of the invention in which the bed or platform is in one solid or integral piece adapting it for use as a truck generally. Fig. 5 is a plan view of the invention showing the manner of lengthening the bed or platform by inserting additional carrying boards or planks between the platform carried by the propelling truck or vehicle and the platform carried by the trailer. Fig. 6 is an enlarged detail perspective view of that part of my invention which I denominate as the equalizer and its connecting chains, cords or rods. Fig. 7 is a detail elevational view showing the manner of connecting bed or platform of the main or propelling vehicle to the bed of the trailer so that it is capable of vertical movement and incapable of lateral movement. Fig. 8 is a perspective view of the movable part of the turn table which is connected to the equalizer, showing also the chains or cords which effect this connection and part of the means of adjustment for lengthening or shortening these chains, as desired. Fig. 9 is an enlarged horizontal sectional view taken through the body of the movable part of the turn table at the points acted upon by the equalizer. Fig. 10 is an enlarged sectional view of one of the adjustable detachable links which join the equalizing chains, cords or rods.

Referring now to the drawings in detail in all of which like letters and numerals of reference represent like or equivalent parts wherever used, 1 represents the front bed or platform for carrying the front part of the load upon the main or propelling vehicle A supported by traction wheels T and steering wheels S, and 2 represents the rear bed or platform for carrying the rear and major portion of the load and is supported by the trailer having wheels W.

3 represents the side bar of the chassis of the main vehicle and 4 cross beams connecting said side bars together.

5 represents the stationary part of a turn table which supports the rear bed or platform 2 by three or more iron cross bars 6 and front and rear braces 7.

8 represents the movable part of the turn table which is supported by two longitudinal bars 9 secured to horizontal cross bars 10 connected to the springs of the vehicle which in turn are carried by the trailer wheels W. The fixed and movable parts of the turn table are pivotally connected together by a king bolt 18.

11, 11 are adjustable equalizing cords, chains or rods connected at their front ends through set-nuts 13, 13 to what I term an equalizer 12 (see Fig. 6) which is pivotally secured near the front end of the main vehicle A to one of the cross beams 4 by a king bolt 18' and in alinement with the axis of the vehicle, said chains, cords or rods being secured on the rear ends of the longitudinal bars 9 by bolts 28 and set nuts 29. These adjustable chains, cords, or rods are provided with detachable links 14 for increasing or decreasing the length of the vehicle as desired (see Figs. 3 and 5). The bed or platform of the vehicle consists, as before stated, of two parts 1 and 2 rigidly secured to the front vehicle and the trailer in the manner shown. These parts have on their lateral faces pivotal connections 15, 15 16, 16. The connections 16, 16 are rigidly secured to the sides of the platforms 1 and 2 and the connections 15, 15 are made up of a series of interconnected links of any desired length. These links are secured at their opposite ends by pins or bolts inserted in the two bodies through the connections 16, 16, as shown in Fig. 2. When it is desired to lengthen the vehicle the short pivotal connection is removed and a longer set of such links is put in place, dependent upon the desired length, and the equalizing chains, cords, or rods are lengthened by adding detachable links 14. 14 (see Figs. 3 and 5).

In Fig. 5 I have illustrated how the two beds or platforms are connected together and made of any desired length. In this form I have shown two flooring boards 26, 26, inserted between the platforms 1 and 2 in substantially the same manner as additional leaves or boards are placed in an extension table. These boards are of the same thickness as the beds or platforms and may be tongued and grooved and held in their position by angle irons 25 located respectively under the front and rear platform, there being shown three sets of these angle irons and these longitudinal flooring bars 17 which may be slipped into place and may partake of vertical vibratory movement as desired. Any change in the length of the vehicle necessitates a corresponding change of the longitudinal flooring bars 17.

Referring to Fig. 1, I will now describe the method of adjusting the equalizing chains, cords, or rods in accordance with the length of the vehicle it is desired to use. These chains, cords or rods are operated by a shaft 19 having drums 20, 20 at its opposite ends journaled in lugs or ears 21, 21 on the rear ends of the longitudinal bars 9, 9. A handle 22 is provided for rotating this shaft and a ratchet wheel 23 located in the center thereof is held in operative position by a pawl 24 carried by the rear cross bar 10. This rotatable device takes up all slack in the chains or cords 11, 11.

I will now describe the mode of operation referring first to Figs. 1, 6 and 8. The vehicle is loaded preferably in the same manner as was the vehicle described in my before mentioned patent, having due respect to the length of the load and the manner of locating the same with regard to the grade to be traversed, it being remembered that the major portion of the load should rest always upon the trailer wheels W and only sufficient load upon the main vehicle A to give the desired traction and steering way to safely carry the load to its destination. When thus loaded it is ready for use and when traveling in a straight line the application of power is over or near the sprocket wheels, in front of the traction wheels T and in a direction through the center of gravity and through the front king bolt 18¹ in the equalizer and the rear king bolt 18 in the plane of the direction of movement of the vehicle (see Fig. 2). Under this condition of affairs the load is conveyed with the least application of power because all six of the wheels are rolling without any axle thrust whatever. Should the chauffeur desire to make a turn as the conditions of the road necessitate, say to the left, the steering wheels S are turned into the position shown in Fig. 8 and the rear or trailer wheels W immediately assume the position shown, and are caused to move in an opposite angular direction by the equalizer, and the action of the surfaces of said wheels upon the road cause the load to turn about a pivot through the center of the axle between the traction wheels T. The thrust of the axle of the wheels T, therefore, is unappreciable because of its pivotal relation to the two pairs of wheels S and W. The equalizer acts not only in response to the application of power to control the movements of the wheels W, but in response to inequalities of the road surface and also in changing the relation of the position of these wheels to the steering wheels S so that no power is lost by reason of this inequality. Also the action of the trailer is such during its entire progress, owing to the flexible connection between the two beds or platforms 1 and 2, that it readily yields vertically in either direction to such inequalities and by reason of the lateral rigid relation to the pivotal connections 15 and 16, thereby preventing any possibility of shifting of the load laterally so that the load moves practically as an integral unit and does not absorb any power in its transmission other than that which acts through the center of gravity, or practically through the center of gravity, by reason of the proximity of the application to such center of gravity. Upon absolutely level or substantially level roads which are of perfect construction the equalizer might be left off and still the invention would be operative; that is to say, the equalizer while performing the additional function of aiding in the movement of the wheels W is not in all cases absolutely essential, as I have found that these wheels W when connected to the trailer in the manner disclosed in Fig. 8 and to the rear bed or platform as disclosed in all of the drawings, will run absolutely independent of the other wheels, and will adjust the whole load in proportion to the variation of the steering wheels, but inasmuch as upon rough roads there is needed an additional adjusting effect for these wheels I find it necessary to apply the equalizer 12 and adjustable chains, cords, or rods 11 and in the manner described, thereby removing all unnecessary strain.

In the modified form of the invention disclosed in Fig. 4 I show how it may be applied to a single bed or platform rigidly connected to both the main vehicle A and the trailer, and this form of the invention is readily applicable in all cases where there is not much unevenness of road or serious grades, and it may be used for a truck adapted to carry all kinds of goods. For the purpose of varying the length of the vehicle as shown in Figs. 1, 2 and 5 I have shown, as heretofore described, means for adapting the same to carry all kinds of portable goods by applying longitudinal bars 17 and angle irons 25 which enable any number of flooring boards to be inserted and I also provide adjustable detachable links 14, as shown in detail in Fig. 10, for varying the length of the equalizer 12, and also an adjustment shown in Fig. 8 for varying the length of the equalizer chains or cords, these means being applied either separately or conjointly, as required.

Various modified forms of the equalizer and adjusting apparatus will be obvious, it being apparent that the modified form of the invention shown in Figs. 12, 13 and 14 of my aforesaid patent, above referred to, may be applied, as that is in effect a pivotal equalizer capable of permitting of the adjustment of rotation of the wheels of the trailer.

I do not limit my invention to any of the specific details disclosed in the accompanying drawings, as obviously it may be widely departed from and still come within the scope of my claims hereinafter made. To illustrate, it may be applied upon steam or other railway cars and on all kinds of vehicles for transporting heavy loads, and in the application of such vehicles it may obviously be applied to vehicles having four wheels in which the application of power is effected through a source of energy either in advance or in the rear of the car thus equipped. In fact in railway cars I should prefer to make this application of the invention where long trains may be used to apply the motors which draw the trains at intervals throughout the length thereof and to connect the same to such motors in any desired way.

Having thus described my invention what I claim and desire to secure by Letters Patent of the United States is—

1. A motor vehicle embracing a plurality of wheels and a source of propelling power carried thereby; in combination with a trailer, a turn table, and an equalizing device located between the steering wheel or wheels and the traction wheels for varying the direction of movement of the wheels of the trailer in accordance with the direction of movement of the steering wheels of the vehicle, substantially as described.

2. A motor vehicle embracing a plurality of wheels; in combination with a trailer having a turn table the fixed part of which is connected to the underside of a bed or platform; together with a bed or platform carried by the front part of the vehicle and rigidly attached thereto, and an equalizing device connected to the movable part of the trailer and the front part of the vehicle, substantially as described.

3. A motor vehicle embracing a plurality of wheels and a bed or platform rigidly attached to the front part thereof; in combination with a trailer the fixed part of which is provided with a second bed or platform pivotally secured to the front platform, the movable part thereof being carried directly by the wheels of said trailer; together with an equalizing device carried by the front part of the vehicle and attached to the movable part of the trailer, substantially as described.

4. A motor vehicle embracing a plurality of wheels and a source of propelling power carried thereby; in combination with a trailer carrying a turn table the stationary part of which is connected to a bed or platform, which in turn is connected to the vehicle in front of said trailer, and an equalizing device located between the steering and the traction wheels of the vehicle and operatively connected to the movable part of the turn table, substantially as described.

5. A motor vehicle embracing a plurality of wheels; in combination with a trailer carrying a turn table, the fixed part of which is connected to a bed or platform, which in turn is connected to a second bed or platform rigidly connected to the vehicle in front of said trailer, and a pivoted equalizing device located between the steering and the traction wheels and operatively connected to the movable part of the turn table, substantially as described.

6. A motor vehicle having a plurality of wheels and a trailer; in combination with a turn table having fixed and movable parts and an equalizing device located between the steering and the traction wheels of the vehicle and operatively connected to the movable part of the turn table, substantially as described.

7. A motor vehicle having steering and traction wheels and a trailer located in the rear of the latter; in combination with a bed or platform carried by said wheels and trailer; a turn table having a fixed part secured to the bed or platform; together with two equalizing cords pivotally supported at their front ends between the steering and traction wheels and secured at their rear ends to the movable part of the turn table, substantially as described.

8. A motor vehicle having a plurality of wheels and a trailer; in combination with a bed or platform carried thereby; a turn table having the fixed part thereof secured to the bed or platform and the movable part connected to the frame of the trailer; together with an equalizing device located between the steering and the traction wheels and connected to the movable part of the turn table, substantially as described.

9. A trailer for a motor vehicle having a turn table; a bed or platform for connecting to the fixed part, the movable part being connected to the axle thereof; in combination with a plurality of vertical flexible connections for attaching it to a vehicle whereby the bed or platform of the trailer is adapted to assume different lengths and partake of vertical movements corresponding to the inequalities of the road while the wheels of the trailer are adapted to partake of lateral angular movements corresponding to the angular variation of the wheels of the vehicle, substantially as described.

10. A trailer for a motor vehicle embracing a bed or platform; a turn table, the fixed part of which is connected to the platform, and the movable part to the wheels thereof; in combination with a plurality of flexible connections for connecting the bed or platform to the body of a vehicle; together with means for connecting the movable part of the trailer to an equalizing device adapted to be located on said vehicle, substantially as described.

11. An extensible carrying bed or platform for motor vehicles embracing two parts; in combination with one or more flooring boards having pivotal links and connections between the parts for connecting them together, substantially as described.

12. A motor vehicle embracing a plurality of wheels and a trailer attached thereto; in combination with an extensible carrying bed or platform carried by the vehicle and the trailer, consisting of a plurality of pivotal links and connections; together with one or more flooring boards adapted to be located between the two parts of the bed or platform, substantially as described.

13. A motor vehicle embracing a plurality of wheels and a bed or platform carried thereby; in combination with a trailer carrying a second bed or platform and expansible connections between said platforms embracing one or more flooring boards and a plurality of detachable supports therefor connecting the vehicle and the trailer together, substantially as described.

14. A motor vehicle embracing a plurality of wheels and a trailer; in combination with a bed or platform carried thereby; together with flexible connections for adapting the bed or platform of the trailer to vibrate vertically, and a plurality of intermediate flooring boards for varying the carrying capacity of the vehicle at will, substantially as described.

15. A motor vehicle embracing a plurality of wheels and a carrying bed or platform carried thereby; in combination with a trailer having a turn table thereon and a second bed or platform carried by the fixed portion of the turn table; together with an equalizing device and flexible connections between it and the movable part of the trailer, and means for permitting the trailer to be located at different distances from the main part of the vehicle, substantially as described.

16. A motor vehicle embracing a plurality of wheels and a trailer, said trailer being provided with a turn table, the movable part of which is connected to an equalizing device carried in front of the traction wheels and behind the steering wheels of the motor vehicle; together with means for adjusting the connections between the equalizer and the trailer, substantially as described.

In testimony whereof I have signed my name to this specification in the presence of two subscribing witnesses.

WILLIAM E. PAINE.

Witnesses:
CHARLES J. KINTER,
WM. A. PARKE.